Jan. 1, 1952     F. SCHAEFER     2,581,048

FORKED CONNECTING MEMBER

Filed March 22, 1950

INVENTOR.
Frederic Schaefer
BY
Brown, Critchlow, Flick & Peckham
his Attorneys

Patented Jan. 1, 1952

2,581,048

UNITED STATES PATENT OFFICE 2,581,048

FORKED CONNECTING MEMBER

Frederic Schaefer, Pittsburgh, Pa., assignor to Schaefer Equipment Company, Pittsburgh, Pa., a corporation of Pennsylvania Application March 22, 1950, Serial No. 151,246

8 Claims. (Cl. 237—20.2)

This invention relates to forked connecting members, and more particularly to the connection by which a metal fork is secured to the end of a rod.

It is among the objects of this invention to provide a metal fork formed to hold itself in axial alignment with a rod while they are being welded together, and to provide a rod joint in which weld-receiving grooves are formed between the fork and the rod.

In accordance with this invention, a metal fork has at its inner end a pair of spaced parallel jaws that extend inwardly along the side surface of the adjoining end portion of a metal rod. A cross member at one side of the rod integrally connects the inner end portions of the jaws and has a concave inner surface that engages and partly encircles the rod. A second cross member at the opposite side of the rod is integrally connected to the outer end portions of the jaws beyond the first cross member. The outer cross member likewise has a concave inner surface which fits part way around the rod. The side surface of the rod is joined by means of welds to the sides of the jaws between each cross member and the opposite end of the jaws. Preferably, the portion of the fork that extends across the adjoining end surface of the rod has a surface inclined lengthwise of the fork from approximately the central longitudinal plane of the fork away from the rod to the side of the fork opposite to the inner cross member, whereby to form with the end of the rod an inwardly tapered groove in which welding metal may be deposited. Similar welding grooves may be formed in like manner along the adjoining portions of the jaws. The inner surface of the inner cross member may be provided with an arcuate groove for receiving any burrs or irregularities at the end of the rod so that the rod will lie flat against the inner surfaces of both cross members.

Figure 1:
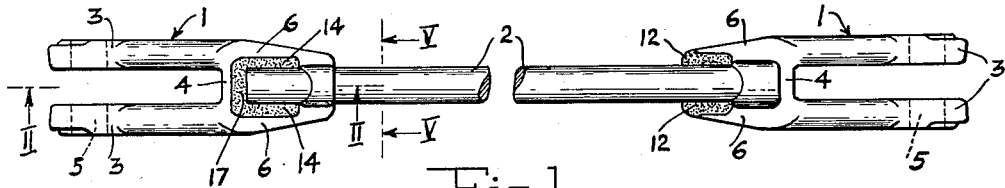
Figure 2:
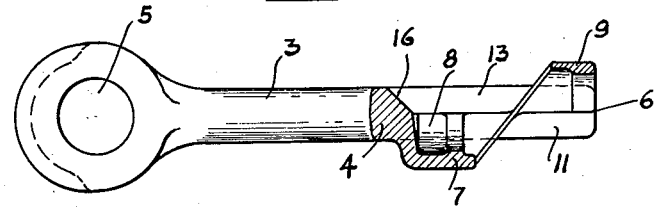
Figure 3:
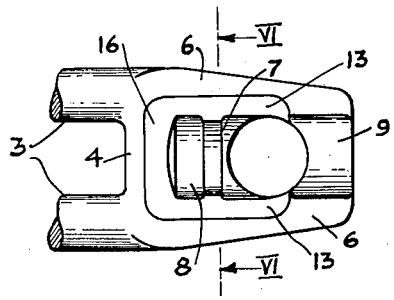
Figure 4:
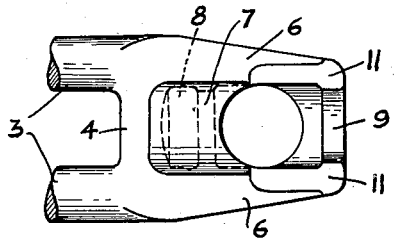
Figure 5:
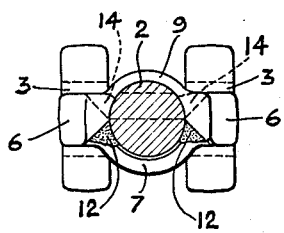
Figure 6:
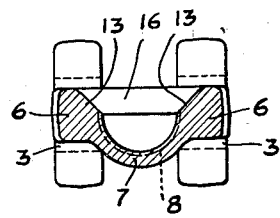

The preferred embodiment of the invention is illustrated in the accompanying drawings, in which Fig. 1 is a side view of a pair of forks welded to the opposite ends of a rod; Fig. 2 is an enlarged longitudinal section through one of the forks, taken on the line II—II of Fig. 1; Figs. 3 and 4 are enlarged fragmentary views of the opposite sides of the jaw end of a fork; Fig. 5 is an enlarged inner end view of a fork and a cross section through the rod, taken on the line V—V of Fig. 1; and Fig. 6 is a cross section taken on the line VI—VI of Fig. 3.

Referring to Fig. 1 of the drawings, a pair of forged connecting elements, such as metal forks 1, are mounted on the opposite ends of a round metal rod 2. The larger part of each fork is formed from parallel arms 3 integrally connected at their inner ends by a transverse portion 4. The outer ends of the arms are enlarged and perforated to form eyes 5 in which a connecting pin (not shown) can be inserted for connecting the fork to an actuating element or to an element which the connecting member is intended to operate. The inner ends of the fork arms have extensions beyond transverse portion 4, which form parallel jaws 6 that receive between them the adjoining end portion of the rod.

In accordance with this invention, the inner end portions of the jaws adjoining transverse portion 4 are connected by a cross member 7 that is integral with them and with the transverse portion. As the jaws are thinner than the rods, this cross member is bowed outward away from the side of the fork so that it can extend part way around the rod, as shown in Figs. 5 and 6. The inner surface of the cross member and adjoining portions of the jaws is substantially semicylindrical, with its axis coinciding with the longitudinal axis of the fork so that the concave inner surface will fit against the side of a rod that is in axial alignment with the fork. However, since the rod may be cut to length by a shear which may squeeze the tip of the rod slightly out of round or leave it with a rough edge or burrs, the inner surface of cross member 7 is provided with an arcuate groove 8 for receiving any such burrs or unevenness that otherwise would hold the side surface of the rod away from the cross member.

The outer end portions of the jaws likewise are integrally connected by a cross member 9 which is bowed outward from the side of the fork opposite to the first cross member. The two cross members do not overlap, but preferably have their adjacent ends spaced apart lengthwise of the jaws to leave more space for welding, as will be shown presently. The inner surface of the outer cross member 9 and adjoining portions of the jaws is substantially semicylindrical, with its axis coinciding with the longitudinal axis of the fork. It fits about half way around the rod. When viewed from the jaw end of the fork, as shown in Fig. 5, the concave inner surfaces of the two cross members 7 and 9 appear to form a circle whose axis coincides with the axis of the fork. It therefore will be seen that when a rod is inserted lengthwise between the jaws and engages the concave inner surfaces of both cross members, the rod will be in axial alignment with the fork. It is held in this position by welds extending along the side of the rod and preferably across its end also.

The side welds are made along the jaws between each cross member and the opposite end of the jaws. To provide for large areas of contact for the welds, the portion of each jaw between the inner cross member 7 and the outer end of the jaw has a surface 11 that is inclined transversely of the fork from the side of the jaw toward the rod and the central longitudinal plane of the fork. This surface forms with the rod an inwardly tapered groove in which welding metal 12 can be deposited, as shown in Figs. 1 and 5. Similar grooves are formed at the opposite side of the fork by providing similar transversely inclined surfaces 13 which extend from the outer cross member 9 to the inner ends of the jaws. These grooves also receive welding metal 14. As all of these welds extend lengthwise of the rod, they do not weaken the rod in tension or compression. The inner ends of inclined surfaces 13 are connected by a surface 16 which is inclined lengthwise of the fork from approximately its central longitudinal plane away from the rod to the side of the fork opposite to the inner cross member. This forms with the end surface of the rod an inwardly tapered groove in which weld metal 17 is deposited.

It is preferred that the rod-engaging surfaces of cross members 7 and 9 be materially narrower than the cross members themselves and that they be located as far apart as possible. This spaces the cross member areas that engage the rod a considerable distance apart and thereby minimizes any misalignment of rod and fork due to a poor fit. It also prevents any burrs that may be formed on the inner surfaces of the cross members, due to punching out the diaphragm between them, from engaging the rod and pushing it out of alignment with the fork.

It will be seen that no jig needs to be used for holding the rod and fork in alignment during welding, because the jaws and cross members correctly position the rod in the fork. If the fork is held horizontally in a vise with the outer cross member 9 down, the rod can be inserted between the jaws and the weight of the rod beyond the fork will hold the rod against the upper cross member 7 until it has been tack welded. The same thing is true if the rod instead of the fork is held in a vise. If the outer ends of both the fork and rod are merely supported high enough above an underlying surface to space the jaws from that surface, then the outer cross member should be uppermost, as will be obvious. In such a case the tendency of the jaws and rod to sag where they join will hold the rod against the inner surfaces of both cross members until tack welds can be made. After tack welding, the tapered welding grooves can be filled in on both sides of the fork and across the ends of the rod.

This connecting member is especially suitable for railroad cars for connecting the brake cylinder with the live lever of the brake rigging. The rods and forks can be shipped separately to the car manufacturer, since he can readily weld the forks onto the ends of the rods with ordinary arc welding equipment. Such connecting members are subjected only to tension, for which purpose the welded connections disclosed herein are as strong as the rod itself.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A metal connecting element adapted to be mounted on an end of a metal rod, said element having at its rod-engaging end a pair of spaced parallel jaws adapted to extend along the side surface of an end portion of such a rod, a cross member at one side of the connecting element connecting the inner end portions of the jaws and having a concave surface adapted to engage the rod, and a second cross member at the opposite side of said element connecting the outer end portions of the jaws beyond said inner cross member, said second cross member having a concave surface adapted to engage the rod, and the side of each jaw being adapted to be welded to said side surface of the rod.

2. A metal connecting element adapted to be mounted on an end of a metal rod, said element having at its rod-engaging end a pair of spaced parallel jaws adapted to extend along the side surface of an end portion of such a rod, a cross member at one side of the connecting element integrally connecting the inner end portions of the jaws and having a concave surface adapted to engage the rod, said cross member being provided with an arcuate groove between said concave surface and the portion of the connecting element that connects the inner ends of the jaws, and a second cross member at the opposite side of said element integrally connecting the outer end portions of the jaws beyond said inner cross member, said second cross member having a concave surface adapted to engage the rod, and the sides of the jaws being adapted to be welded to said side surface of the rod.

3. A metal connecting element adapted to be mounted on an end of a metal rod, said element having at its rod-engaging end a pair of spaced parallel jaws adapted to extend along the side surface of an end portion of such a rod, a cross member at one side of the connecting element integrally connecting the inner end portions of the jaws and having a concave surface adapted to engage the rod, said cross member being provided with an arcuate groove between said concave surface and the portion of the connecting element that connects the inner ends of the jaws, and a second cross member at the opposite side of said element integrally connecting the outer end portions of the jaws beyond said inner cross member, said second cross member having a concave surface adapted to engage the rod, the concave surface of said second cross member being materially narrower than the cross member and being located at the outer ends of the jaws, and the sides of the jaws being adapted to be welded to said side surface of the rod.

4. A metal connecting element adapted to be mounted on an end of a metal rod, said element having at its rod-engaging end a pair of spaced parallel jaws adapted to extend along the side surface of an end portion of such a rod, a cross member at one side of the connecting element integrally connecting the inner end portions of the jaws and having a concave surface adapted to engage the rod, and a second cross member at the opposite side of said element integrally connecting the outer end portions of the jaws beyond said inner cross member, said second cross member having a concave surface adapted to engage the rod, the portion of the connecting element that connects the inner ends of the jaws having a surface inclined lengthwise of said element from approximately the central longitudinal plane of said element to the side of the connecting element opposite to said inner cross member, said inclined surface being adapted to form with the end surface of the rod an inwardly tapered groove for reception of welding metal, and the sides of the jaws between each cross member and the opposite end of the jaws being adapted to be welded to said side surface of the rod.

5. A metal connecting element adapted to be mounted on an end of a metal rod, said element having at its rod-engaging end a pair of spaced parallel jaws adapted to extend along the side surface of an end portion of such a rod, a cross member at one side of the connecting element connecting the inner end portions of the jaws and having a concave surface adapted to engage the rod, and a second cross member at the opposite side of said element connecting the outer end portions of the jaws beyond said inner cross member, said second cross member having a concave surface adapted to engage the rod, and the portion of each jaw between a cross member and the opposite end of the jaw having a surface inclined transversely of the connecting element from the side of the jaw toward the central longitudinal plane of said element, said inclined surface being adapted to form with the rod an inwardly tapered groove for reception of welding metal.

6. A metal connecting element adapted to be mounted on an end of a metal rod, said element having at its rod-engaging end a pair of spaced parallel jaws adapted to extend along the side surface of an end portion of such a rod, a cross member at one side of the connecting element connecting the inner end portions of the jaws and having a concave surface adapted to engage the rod, and a second cross member at the opposite side of said element connecting the outer end portions of the jaws beyond said inner cross member, said second cross member having a concave surface adapted to engage the rod, and the portions of each jaw between each cross member and the opposite end of the jaw having surfaces inclined transversely of the connecting element from the side of the jaw toward the central longitudinal plane of said element, said surfaces being adapted to form with the rod a pair of inwardly tapered grooves for reception of welding metal.

7. A metal connecting element adapted to be mounted on an end of a metal rod, said element having at its rod-engaging end a pair of spaced parallel jaws adapted to extend along the side surface of an end portion of such a rod, a cross member at one side of the connecting element integrally connecting the inner end portions of the jaws and having a concave surface adapted to engage the rod, and a second cross member at the opposite side of said element integrally connecting the outer end portions of the jaws beyond said inner cross member, said second cross member having a concave surface adapted to engage the rod, the portion of the connecting element that connects the inner ends of the jaws having a surface inclined lengthwise of said element from approximately the central longitudinal plane of the connecting element to the side of said element opposite to said inner cross member, and the portions of the jaws between said second cross member and the ends of said inclined surface having surfaces inclined transversely of the connecting element from the side of the jaws toward said plane, said inclined surfaces being adapted to form with the rod three inwardly tapered grooves for reception of welding metal.

8. A rod joint comprising a metal rod, a metal connecting element mounted on an end of the rod, said element having at its rod-engaging end a pair of spaced parallel jaws extending along the side surface of the adjoining end portion of the rod, a cross member at one side of the rod connecting the inner end portions of the jaws and having a concave surface engaging the rod, a second cross member at the opposite side of the rod connecting the outer end portions of the jaws beyond said inner cross member, said second cross member having a concave surface engaging the rod, and welds joining said side surface of the rod with the sides of the jaws.

FREDERIC SCHAEFER.

No references cited.